J. W. Warren, Jr.

Portable Bath.

No. 103.

Reissued Oct. 16 1847.

UNITED STATES PATENT OFFICE.

J. WRIGHT WARREN, JR., OF BOSTON, MASSACHUSETTS, ASSIGNOR TO CHARLES KANE, OF NEW YORK, N. Y.

IMPROVEMENT IN PORTABLE BATHS.

Specification forming part of Letters Patent No. 1,710, dated July 31, 1840; Reissue No. 103, dated October 16, 1847.

*To all whom it may concern:*

Be it known that I, J. WRIGHT WARREN, Jr., M. D., of Boston, in the county of Suffolk and State of Massachusetts, have invented new and useful improvements in the apparatus for various kinds of bathing, which I denominate a "Portable Bathing Tent;" and I do hereby declare that the following is a full, clear, and exact description thereof.

These improvements, the principles thereof, the application of said principles by which the same may be distinguished from other inventions, together with such parts, improvements, or combinations I claim as my invention and hold to be original and new, I have herein set forth and described, which description, taken in connection with the accompanying drawings, herein referred to, composes my specification.

The object of my invention is to combine in one arrangement all the conveniences for taking all the several descriptions of baths—such as warm, cold, vapor, medicated vapor, and shower baths—said arrangement being combined with due regard to simplicity and portability.

The figures of the accompanying plate of drawings represent my improvements.

Figure 1:
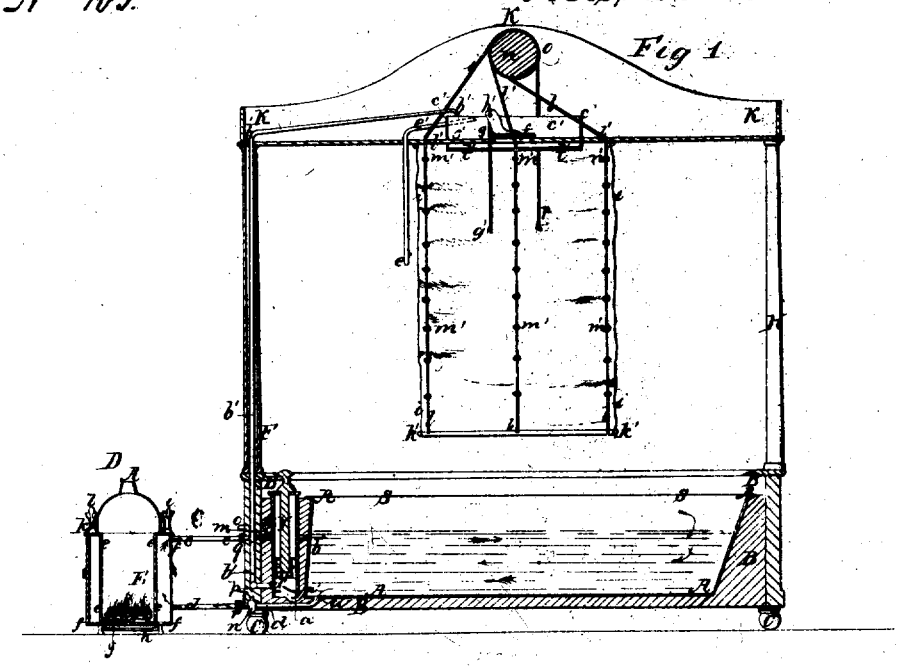
Figure 2:
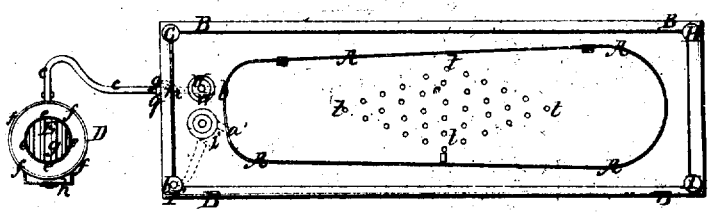
Figure 3:
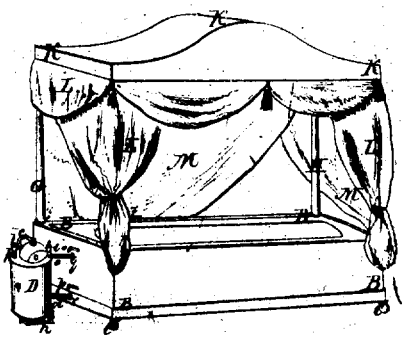

Figure 1 is a vertical section of the apparatus. Fig. 2 is a horizontal sectional view. Fig. 3 is a perspective view, and Fig. 4 a detail view of the medicating-tube.

A A A A is the bathing-tub, shaped as seen in Figs. 1 and 2, and formed of zinc or any other suitable material. This tub is inclosed by a proper casing of wood, B B B B, Figs. 2 and 3, to the bottom of which are attached suitable legs or standards, C C C. In case of a common cold bath it is only necessary to fill the tub to the requisite height with water. For a warm bath likewise the bathing-tub must have the necessary quantity of cold water in it, the water being heated by the following arrangement of machinery:

At the foot of the tub A A A A two circular holes or apertures, *a b*, are made, the aperture *a* being at the bottom of the tub, the other being situated at a height a little less than that to which a quantity of water sufficient for bathing would stand in the tub. One end of each of two pipes, *c c d d*, (said pipes being covered with worsted or any proper substance,) is inserted in the apertures *a b*, each of the other ends of said pipes communicating, respectively, with the top and bottom of the boiling apparatus at D D D D. This boiling apparatus consists of two contric cylinders, *e e e f f f*, Figs. 1 and 2, between which cylinders the water to be heated must pass or be placed. The space E in the inner or smaller cylinder, *e e e*, serves as a fire-chamber, and contains the fuel or fire from which the heat is derived, and is arranged with a grate or grating, *g g*, in the bottom, as seen in Figs. 1 and 2, underneath which is an ash-pan, *h h*, which slides in and out in any proper manner. The boiling-space is provided with a safety-valve at *i i*, to prevent the occurrence of any accident from an undue pressure of steam in the boiler, the operation of which safety-valve will be readily understood by an inspection of the boiling apparatus in Fig. 1. On the opposite side of the fire-chamber E is a conducting pipe or tunnel, *k*, with a screw-stopper, *l*, in the same, by removing which the water may be fed to the boiler or space between the cylinders *e e e f f f* when it is not introduced from the bathing-tub. Now, suppose the tub to be filled above the upper pipe, *c c*, with water, the communication being open to the boiler through the pipes *c c d d*, it will be seen from the well-known laws of fluids that the water will adjust itself to a level in the two vessels, and when a fire is made in the furnace E that the heated liquid in the boiler, rising to the top of the same, will flow out through the pipe *c c* into the tub, and its place be supplied by the colder liquid moving through the lower pipe, *d d*, and in this way a constant circulation is kept up, as represented by arrows in Fig. 1, until the liquid is heated to the desired temperature. When this is accomplished, the operation is checked by the stop-cocks *m n*, Fig. 1, operated by the bent levers or handles *o p*, by which the communication between the boiler and tub may be opened or closed at pleasure.

From the above-described arrangement the convenience of taking a warm bath in my apparatus will be sufficiently apparent. After using the water in the tub it may be withdrawn from the same by unscrewing the pipes *c c d d*, for which provision is made by means of nuts and screws, as shown at *q r*.

I shall now proceed to describe such additional parts as are necessary in taking a vapor bath. To the four corners of the wooden casing B B B B are affixed the pillars or upright standards F G H I, on the top of which the hollow pediment K K is fixed, shaped as seen in Figs. 1 and 3. Around the pediment K K the double sets of curtains L L M M, Fig. 3, are arranged, the exterior or crimson-colored curtain being used merely to add neatness and elegance to utility in the apparatus, to make it suitable as an article of household furniture. The inner curtain is composed of oil-silk or any other water-proof cloth, which, when down, forms, as it were, a close apartment and prevents the water in the tub from being thrown into the room by the motions of the body while bathing, and likewise retains the vapor within the apartment so formed. A cover, *s s*, is placed on top of the bathing-tub A A A A, which cover turns on proper hinges, and has holes perforated through the same at *t t*, as seen in Fig. 2. Now, in order to take a vapor bath the tub A A A A should be empty and the stop-cock *n* be closed, so as to shut off all communication through the lower pipe. The water being introduced through the tunnel or pipe *k*, as has been described, the steam generated from the same will pass into the tub through the upper pipe, *c c*, and the bath may be taken in the tub, or by standing or resting on the cover *s s*, through the holes *t t* of which the vapor passes into the apartment formed by the curtains, as above described. The cover *s s* likewise serves, in case of warm bath, to expedite the process of heating the water by excluding the cold atmosphere from the tub.

Figure 4:
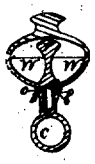

If we wish to medicate the vapor bath it can be done by means of the upright tube *u*, Fig. 4, communicating with the pipe *c c*. This tube has a screw-stopper, *v*, and a covered cap or other proper-shaped vessel, *w w*, in which the prescribed essence or medicament is placed. The stopper *v* is hollow, as seen in Fig. 4, and has a suitable shoulder and washer, as shown at *x*, so as when screwed down to effectually close the pipe or tube *u*. Directly underneath the washer at *x* small holes *s' s'*, &c., are drilled to communicate with the tube of the stopper *v*, so that by loosening or unscrewing the stopper the oil or essence will ooze, as it were, into the pipe of the stopper, and, dropping gradually into the pipe *c c*, through which the steam from the boiler passes, will evaporate, and thereby impregnate the vapor and prepare the desired bath.

The arrangement and conveniences for a warm or cold shower-bath may be thus described: A force-pump, *y y*, is arranged at the foot of the bathing-tub on one side of the medicater *u u*. This pump has a proper valve, *z*, Fig. 1, and communicates with the tub by means of the pipe *a' a'*, opening into the same. The water being drawn into the cylinder of the pump is forced into the pipe *b' b' b' b'*, which leads up through the pillar or standard F (made hollow for the purpose) and conducts to the receiving-vessel *c' c'*, the return of the water to the cylinder of the pump being prevented by the valve *d'*, Fig. 1. When the vessel *c' c'* is full, the fact is indicated by the discharge-pipe *e' e'*, one end of which opens into the vessel at or near the top of the same. Beneath the vessel *c' c'* is the showering-tub *t' t'*, the bottom of which is suitably perforated, as shown in Fig. 1. A weighted valve, *f'*, serves to open or close the communication between the two vessels. This valve is controlled by the bather by means of the cord *g' g'*, one end of which is attached to the arm *h'* of the valve, the other end passing down within his reach. While taking the shower-bath, the bather is inclosed by the circular curtain *i i i i*, formed of any suitable water-proof cloth weighted and kept in shape by a metallic wire or hoop, *k' k'*. When this curtain is not in use, it is drawn up in folds by means of cords *l' l' l' l' l' l'* passing through rings *m' m' m'*, &c., in the interior of the curtain. The ends of said cords are attached to the hoop at the bottom of said curtain. The other ends of these cords are attached (when the curtain is down) to any part of the surface of the cylinder or roller *n'*, Fig. 1, which revolves in suitable bearings in the hollow pediment. Another cord, *o' p'*, has one end attached to the cylinder *n'*, and the cord is wound several times round the cylinder, the other end, *p'*, being within the reach of the bather. It will readily be seen that if the loose end *p'* of the cord is drawn down it will unwind, and by so doing turn the cylinder, thereby winding the cords *l' l' l' l'*, &c., up in an opposite direction. By this means the curtain is drawn up and is retained in its position by a loop in the end of the cord *o' p'*, attached to any proper hook on the side of the wooden casing of the bathing-tub.

The smoke from the furnace or boiling apparatus may be conveyed to any flue by means of a proper funnel or pipe leading from the top of the furnace at A'.

Having completed the description of the machinery, I shall now proceed to specifically point out those parts I claim as my invention and hold to be original and new.

1. Impregnating or medicating the vapor bath by means of the tube *u u* and hollow screw-stopper *v*, with holes or openings *s' s'* in said stopper, through which the liquid in the cup *w w* will pass into the tube *u u* when the stopper is unscrewed, as herein described, in combination with the conducting-pipe *c c*, through which the vapor passes to the tub A A A A.

2. In combination with the bathing-tub, the showering apparatus above mentioned, and the discharge or alarm pipe, for the object hereinbefore set forth, and likewise the circular curtain *i i i i*, for inclosing the bather while taking the shower-bath, said curtain being operated by the several cords *l′ l′ l′ l′ l′ l′ o′ o′* working with the roller or cylinder *n′*, as explained in the foregoing description.

J. WRIGHT WARREN, JR.

Witnesses:
ARTEMAS SIMONDS,
W. WILLETT.